United States Patent [19]

Mark

[11] 4,430,485

[45] Feb. 7, 1984

[54] FLAME RETARDANT POLYCARBONATE COMPOSITIONS

[75] Inventor: Victor Mark, Evansville, Ind.

[73] Assignee: General Electric Company, Mt. Vernon, Ind.

[21] Appl. No.: 347,484

[22] Filed: Feb. 10, 1982

Related U.S. Application Data

[63] Continuation-in-part of Ser. No. 176,868, Aug. 11, 1980, abandoned.

[51] Int. Cl.³ .................... C08G 63/12; C08G 63/62; C08L 67/00
[52] U.S. Cl. ................................. 525/439; 525/462; 528/171; 528/174; 528/193; 528/196; 528/204
[58] Field of Search .............. 528/204, 196, 171, 174, 528/193; 525/439

[56] References Cited

U.S. PATENT DOCUMENTS

| | | | |
|---|---|---|---|
| 2,999,846 | 9/1961 | Schnell et al. | 528/204 |
| 3,028,365 | 4/1962 | Schnell et al. | 528/196 |
| 3,271,367 | 9/1966 | Schnell et al. | 528/204 |
| 3,285,875 | 11/1966 | Bottenbruch et al. | 528/204 |
| 3,359,238 | 12/1967 | Goldberg et al. | 528/204 |
| 3,398,212 | 8/1968 | Jackson et al. | 528/204 |
| 3,451,966 | 6/1969 | Gregory et al. | 528/204 |
| 3,635,895 | 1/1972 | Kramer | 528/204 |
| 3,737,409 | 6/1973 | Fox | 528/204 |
| 3,912,688 | 10/1975 | Schiller et al. | 528/204 |
| 4,043,980 | 8/1977 | Baron et al. | 528/204 |
| 4,174,359 | 11/1979 | Sivaramakrishnan et al. | 528/204 |

FOREIGN PATENT DOCUMENTS

| | | | |
|---|---|---|---|
| 1187797 | 2/1965 | Fed. Rep. of Germany | 528/204 |
| 2721595 | 12/1977 | Fed. Rep. of Germany | 528/204 |

*Primary Examiner*—Harold D. Anderson
*Attorney, Agent, or Firm*—Martin B. Barancik

[57] ABSTRACT

Flame retardant polycarbonate and copolyestercarbonate compositions, and articles made therefrom, are disclosed which are obtained from polymers derived from non-polycyclic, sulfur-free diphenols and polymers derived from sulfur-containing diphenols.

19 Claims, No Drawings

FLAME RETARDANT POLYCARBONATE COMPOSITIONS

RELATED APPLICATIONS

This application is a continuation-in-part application of copending application Ser. No. 176,868, filed Aug. 11, 1980, now abandoned.

BACKGROUND OF THE INVENTION

The increasing concern for safety has resulted in increased efforts towards providing safer materials for commercial and household use. One particular area of need is that of providing flame retardant plastic products, many of which are now required to meet certain flame retardant criteria established by local and federal governments as well as by the manufacturers of such products. One particular set of conditions commonly accepted and used as a standard for flame retardancy is that which is set forth in Underwriter's Laboratories, Inc. Bulletin 94 which proscribes certain conditions by which material are rated for self-extinguishing characteristics.

It is known that various halogen-containing, flame retardant additives can be employed to render plastic products self-extinguishing or flame retardant. Such flame retardant additives are typically employed in amounts sufficient to be effective for their intended purpose; generally, on the order of about 5–20% by weight based upon the weight of the plastic composition. In many instances, use of these flame retardants in such amounts can have a degrading affect upon the plastic compositions to be rendered flame retardant often resulting in the deterioration of valuable physical properties of the base polymer. This is particularly so when known flame retardant additives are employed with polycarbonate resins since many of these additives have a degrading affect upon the base polymer typically resulting in the discoloration and a loss of impact strength.

It is also known that blends and/or copolymers of halogen-containing copolycarbonates and aromatic thiodiphenols can be employed to obtain flame retardant compositions. For example, U.S. Pat. No. 4,043,980 discloses polycarbonate compositions obtained as the reaction product of an aromatic diol, a halogenated phenol, an a carbonic acid coreacted with an aromatic thiodiphenol (TDP), which compositions exhibit flame retardancy stated to be the result of the synergism between the sulfur and the halogen present in the compositions. It is also disclosed that such compositions overcome the detrimental critical thickness effect, i.e., that thickness at which notched Izod values of a test sample begin to decrease, due to the presence of sulfur in the composition.

In U.S. Pat. No. 4,174,359, flame retardant polycarbonate compositions are disclosed which are obtained as blends of an aromatic diphenol-TDP copolymer and a halogen containing compound. The compositions can also contain small amounts of a sulfonic or carboxylic acid salt, which salt is preferably perfluorinated. However, both of these patents teach that the presence of the halogen containing moiety is essential in the compositions disclosed.

Other sulfur-containing polycarbonate compositions are also known such as crystalline copolycarbonates obtained as the reaction of polycarbonate and TDP as disclosed in "Polycarbonates and Mixed Polycarbonates bases on Bis(4-hydroxyphenyl)sulfide", O. V. Smirnova, G. S. Kolesnikov, A. K. Mikitaeo and T. G. Krichevskaya (Mosk. Khim-Teckhnol. Inst. im Mendeleeva, Moscow), Vysokomol Soldin, Ser. 4 10(1), 96 101(1968) (Russ), also reported in "Chem. Abstracts"; 68, 1968.

In addition, U.S. Pat. No. 3,398,212 discloses copolymers and blends of copolycarbonates and copolyesters prepared from halogenated or non-halogenated polycyclic gem-bisphenols and TDP.

Further, in an article entitled "Linear Aromatic Polyesters of Carbonic Acid", H. Schnell (Ind. Chem. Eng., 1959) there is disclosed crystallizable polycarbonates which contain TDP.

There is a need, however, for generally amorphous, non-crystalline polycarbonates which exhibit flame retardancy and improved thick section impact. It is, therefore, an object of the instant invention to provide such polycarbonate compositions.

SUMMARY OF THE INVENTION

The instant invention is directed to generally amorphous, non-crystalline polycarbonate compositions derived from halogen-free and sulfur-free non-polycyclic dihydric phenols and halogen-free thiodiphenols. These compositions are flame retardant and exhibit improved thick section impact.

DESCRIPTION OF THE INVENTION

It has now been found that the flammability of halogen-free, conventional, aromatic polycarbonate compositions can be dramatically improved by the incorporation therein of sulfur-containing polycarbonates derived from sulfur-containing diphenols. The effect is truly remarkable in that high degrees of flame retardancy are achieved without the presence of any halogen additives and/or halogen-containing polycarbonates.

The sulfur-containing but halogen-free aromatic polycarbonates can be present as copolycarbonates derived from mixtures of non-polycyclic, halogen-free and sulfur-free diphenols and halogen-free sulfur-containing diphenols or as blends of conventional halogen-free polycarbonates and halogen-free sulfur-containing polycarbonates. The term "conventional" as used throughout this application is intended to encompass and should be understood as encompassing polycarbonates derived from diphenols that are non-polycyclic and that are free of sulfur and halogen substituents in their molecular structure. The flame retardant polycarbonate compositions of the invention comprise the sulfur-free, halogen-free non-polycyclic dihydric phenols and the halogen-free sulfur-containing diphenols either as a chemical mixture or a physical mixture, or both. When present as a chemical mixture, the sulfur-free and halogen-free polycarbonate and the halogen-free sulfur-containing polycarbonate are linked together by chemical bonds, such as in copolycarbonates. Thus, copolycarbonates of two, or more, components can be coreacted to form alternating or random or block copolycarbonates as well as chemical mixtures thereof. Represented symbolically by A and B for the two diphenol-derived moieties, an alternating copolycarbonate structure would be as follows:

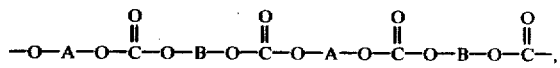

etc. while a random copolycarbonate would have the structure

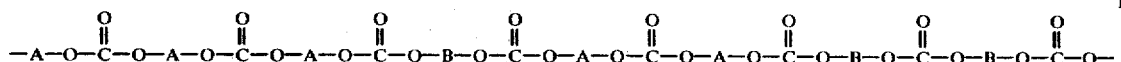

etc. and a block copolycarbonate would have the structure:

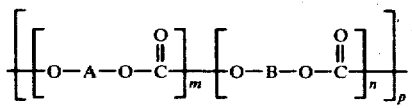

wherein m and n are greater than 1 and p is at least 1.

Chemical mixtures of such copolycarbonates would be represented by structures in which the structures shown in formulae I and/or II and/or III are joined together by chemical bonds.

The non-polycyclic, halogen-free and sulfur-free polycarbonate and the halogen-free sulfur-containing polycarbonate can also be present as a physical mixture or blend of two or more components wherein no chemical interaction occurs and, thus, no chemical bonds are present linking the components together. Represented symbolically, a physical mixture of the two polycarbonates, in its simplest form, would contain the moieties shown below:

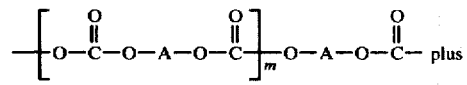

IVa

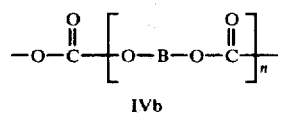

IVb wherein m and n have the same value as above, or as physical mixtures of IVa and I and/or II and/or III, or as physical mixtures of IVb with I and/or II and/or III, or as physical mixtures of I and II, or I and III, or II and III, or IVa plus IVb with I and/or II and/or III.

In addition, the polycarbonate compositions can comprise both chemical and physical mixtures.

Accordingly, in the practice of this invention, the conventional halogen-free, sulfur-free non-polycyclic aromatic polycarbonates that can be employed are copolymers and homopolymers that can be prepared by reacting a halogen-free and sulfur-free non-polycyclic diphenol with a carbonate precursor. Typical of some of the diphenols that can be employed are 2,2-bis(4-hydroxyphenyl)propane, (also known as bisphenol-A or BPA), bis(4-hydroxyphenyl)methane, 2,2-bis(4-hydroxy-3-methylphenyl)propane, 4,4-bis(4-hydroxyphenyl)heptane, 1,1-bis(4-hydroxyphenyl)ethane, 1,1-bis(4-hydroxyphenyl) cyclohexane, 1,1-bis(4-hydroxyphenyl)propane, 3,3-bis (4-hydroxyphenyl)pentane, and the like. Other halogen-free and sulfur-free non-polycyclic diphenols of the bisphenol type are also available such as are disclosed in U.S. Pat. Nos. 2,999,835; 3,028,365: and 3,335,154 incorporated herein by reference.

The halogen-free polycarbonate compositions of the instant invention are formed by coreacting, as essential ingredients, (i) at least one halogen-free, sulfur-free non-polycyclic dihydric phenol; (ii) at least one halogen-free thiodiphenol; and (iii) a carbonate precursor.

The non-polycyclic, halogen-free and sulfur-free dihydric phenols or diphenols can be represented by the general structural formula

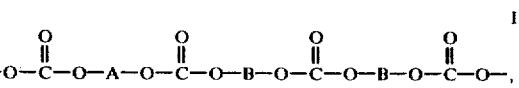

wherein:

X is independently selected from monovalent hydrocarbon radicals;

X' is independently selected from monovalent hydrocarbon radicals;

W is selected from non-polycyclic divalent hydrocarbon radicals, the —O— radical, and the

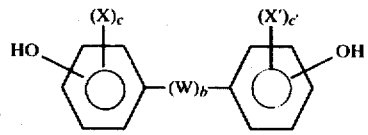

radical;

c and c' are independently selected from whole numbers having a value of from 0 to 4 inclusive; and b is either one or zero.

The monovalent hydrocarbon radicals represented by X and X' are selected from alkyl radicals, aryl radicals, aralkyl radicals, and alkaryl radicals.

Preferred alkyl radicals represented by X and X' are those containing from 1 to about 5 carbon atoms. Some illustrative non-limiting examples of these preferred alkyl radicals include methyl, ethyl, propyl, isopropyl, butyl, isobutyl, pentyl, neopentyl, and the like.

The preferred aryl radical represented by X and X' is the phenyl radical.

Preferred aralkyl and alkaryl radicals represented by X and X' are those containing from 7 to about 11 carbon atoms and include benzyl, ethylphenyl, propylphenyl, and the like.

The non-polycyclic divalent hydrocarbon radicals represented by W are selected from alkylene radicals, alkylidene radicals, and monocyclic aliphatic hydrocarbon radicals.

The preferred alkylene radicals represented by W are those containing from 1 to about 8 carbon atoms. The preferred alkylidene radicals represented by W are those containing from 2 to about 8 carbon atoms. Some illustrative non-limiting examples of these preferred alkylene and alkylidene radicals include methylene, ethylene, 1,3-propylene, 1,2-propylene, propylidene, isopropylidene, butylene, isobutylene, butylidene, isobutylidene, and the like.

The monocyclic aliphatic divalent hydrocarbon radicals represented by W are selected from cycloalkylene and cycloalkylidene radicals. Preferred cycloalkylene and cycloalkylidene radicals are those containing from from about 5 to about 12 carbon atoms. The more preferred cycloalkylene and cycloalkylidene radicals may be represented by the general formula

$$\begin{array}{c} (R)_d \\ | \\ -Z- \end{array} \qquad \text{VI.}$$

wherein:

R is independently selected from lower alkyl radicals, preferably those containing from 1 to about 4 carbon atoms;

Z is a cycloalkylene or cycloalkylidene radical containing from 5 to about 8 carbon atoms in the monocyclic structure; and d is a whole number having a value of from 0 up to an including the number of replaceable hydrogen atoms present on Z, preferably d has a value of from 0 to 4 inclusive.

Some illustrative non-limiting examples of these preferred cycloalkylene and cycloalkylidene radicals include cyclopentylene, cyclopentylidene, cyclohexylene, cyclohexylidene, methylcyclohexylene, ethylcyclohexylidene, and the like.

In the dihydric phenol compound represented by Formula V, when more than one X substituent is present they may be the same or different. The same is true for the X' substituent. Where b is zero in Formula V the aromatic rings are directly joined with no intervening alkylene or other bridge. The positions of the hydroxyl groups and X or X' on the aromatic nuclear residues can be varied in the ortho, meta, or para positions and the groupings can be in a vicinal, asymmetrical or symmetrical relationship, where two or more ring carbon atoms of the aromatic hydrocarbon residues are substituted with X or X' and hydroxyl group.

Preferred X and X' substituents are the alkyl, preferably the lower $C_1$-$C_5$ alkyl, radicals.

Some illustrative non-limiting examples of the dihydric phenols of Formula V include:
2,2-bis(4-hydroxyphenyl)propane (bisphenol-A);
2,4'-dihydroxydiphenylmethane;
bis(2-hydroxyphenyl)methane;
bis(4-hydroxyphenyl)methane;
1,1-bis(4-hydroxyphenyl)ethane;
1,2-bis(4-hydroxyphenyl)ethane;
1,1-bis(2,5-dimethyl-4-hydroxyphenyl)ethane;
1,3-bis(3-methyl-4-hydroxyphenyl)propane;
2,2-bis(3-isopropyl-5-ethyl-4-hydroxyphenyl)propane;
2,2-bis(3-isopropyl-4-hydroxyphenyl)propane;
2,2-bis(2,3,5,6-tetramethyl-4-hydroxyphenyl)propane;
2,2-bis(3,5-dimethyl-4-hydroxyphenyl)propane;
2,2-bis(3-methyl-5-ethyl-4-hydroxyphenyl)propane;
bis(3,5-dimethyl-4-hydroxyphenyl);
4,4'-dihydroxybiphenyl;
1,4-bis(3,5-dimethyl-4-hydroxyphenyl)cyclohexane;
1,4-bis(4-hydroxyphenyl)cyclohexane;
1,1-bis(4-hydroxyphenyl)cyclohexane;
4,4'-dihydroxy-3,5-dimethyldiphenyl ether;
4,4'-dihydroxy diphenyl ether; and the like.

Some particularly useful non-polycyclic, halogen-free and sulfur-free dihydric phenols, from the standpoint of providing polycarbonates exhibiting a particularly good balance of physical properties, are those represented by the general formula

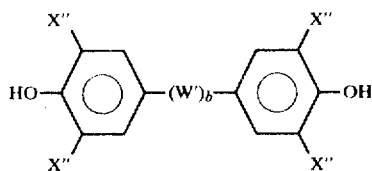

wherein:

each X" is independently selected from the group consisting of hydrogen and alkyl radicals containing from 1 to about 5 carbon atoms.

W' is selected from alkylene radicals containing from 1 to 8 carbon atoms, alkylidene radicals containing from 2 to 8 carbon atoms, cycloalkylene radicals containing from 5 to 12 carbon atoms, and cycloalkylidene radicals containing from 5 to 12 carbon atoms; and b is as defined above.

Preferred compounds of Formula VII are those wherein W' is selected from alkylene and alkylidene radicals.

The sulfur-containing halogen-free diphenols from which the halogen-free, sulfur-containing nonpolycyclic polycarbonates are obtained are the halogen-free thiodiphenols represented by the general formula

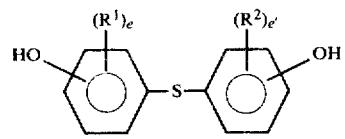

wherein:

$R^1$ is independently selected from monovalent hydrocarbon radicals;

$R^2$ is independently selected from monovalent hydrocarbon radicals; and e and e' are independently selected from whole numbers having a value of from 0 to 4 inclusive.

The monovalent hydrocarbon radicals represented by $R^1$ and $R^2$ are selected from alkyl, aryl, alkaryl, and aralkyl radicals. Preferred alkyl radicals represented by $R^1$ and $R^2$ are those containing from 1 to about 6 carbon atoms.

The preferred aryl radical is the phenyl radical.

Preferred aralkyl and alkaryl radicals represented by $R^1$ and $R^2$ are those containing from 7 to about 11 carbon atoms.

Preferred thiodiphenols of Formula VIII are those wherein $R^1$ and $R^2$ are independently selected from alkyl radicals, preferably lower alkyl radicals of from 1 to about 4 carbon atoms, and thiodiphenol itself, i.e., wherein e and e' in Formula VIII are both 0.

In the thiodiphenol compounds of Formula VIII when more than one $R^1$ substituent is present they may be the same or different. The same is true for the $R^2$ substituent. The positions of $R^1$ or $R^2$ and the hydroxyl groups on the aromatic nuclear residues can be varied in the ortho, meta, or para positions and the groupings can be in a vicinal, asymmetrical or symmetrical relationship, where two or more ring carbon atoms of the aromatic hydrocarbon residues are substituted with $R^1$ or $R^2$ and hydroxyl group.

Some illustrative non-limiting examples of the halogen-free thiodiphenols of Formula VIII include:
4,4'-thiodiphenol;
2-methyl-4,4'-thiodiphenol;
3-methyl-4,4'-thiodiphenol;
2,2'-dimethyl-4,4'-thiodiphenol;
2,2'-ditertiarybutyl-4,4'-thiodiphenol;
3,3'-ditertiarybutyl-4,4'-thiodiphenol;
2,2',3,3',5,5',6,6'-octamethyl-4,4'-thiodiphenol;
3,3'-diethyl-4,4'-thiodiphenol;
3-methyl-3'-ethyl-4,4'-thiodiphenol;
2,2',6,6'-tetramethyl-4,4'-thiodiphenol;
3,3',5,5'-tetramethyl-4,4'-thiodiphenol;
3,5-dimethyl-4,4'-thiodiphenol;
2,2',3,3',5,5'-hexamethyl-4,4'-thiodiphenol; and the like.

Preferred thiodiphenols, from the standpoint of providing polycarbonates exhibiting particularly good all-around properties, are those represented by the general formula

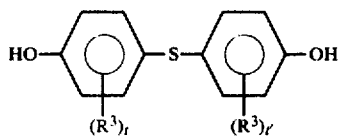

IX.

wherein each $R^3$ is independently selected from hydrogen and alkyl radicals containing from 1 to 4 carbon atoms; and t and t' are independently selected from integers having a value of 1 to 2 inclusive.

Some of these thiodiphenols may be prepared by known methods such as, for example, those described in U.S. Pat. No. 3,931,335, which is hereby incorporated herein by reference.

It is, of course, possible to employ two or more different diphenols in either or both the sulfur-free and sulfur-containing components or a copolymer of a diphenol with a glycol or with a hydroxy or acid terminated polyester, or with a dibasic acid in the event a carbonate copolymer or interpolymer rather than a homopolymer is desired for use in the preparation of the aromatic carbonate polymers of this invention. Also, blends of any of the above materials can be employed to provide the aromatic polycarbonate.

It is also possible to employ mixtures of two or more different thiodiphenols of Formula VIII in the practice of the instant invention. Therefore, wherever the terms dihydric phenol or thiodiphenol are used herein it is to be understood that these terms include mixtures of two or more dihydric phenols or thiodiphenols as well as individual dihydric phenols or thiodiphenols.

The carbonate precursor can be a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; di-(alkylphenyl)carbonates such as di(tolyl) carbonate, etc; di-(naphthyl)carbonate; phenyl tolyl carbonate, etc., or mixtures thereof. The haloformates which can be used include bis-haloformates of the diphenols employed, including both the sulfur-free and sulfur-containing bisphenols, such as BPA-bis(chloroformate) and thiodiphenol bis(chloroformate) and their congeners. While other carbonate precursors will occur to those skilled in the art, carbonyl chloride, also known as phosgene, is preferred.

One method which may be utilized in preparing the polycarbonates of the instant invention involves the heterogeneous interfacial polymerization system utilizing an aqueous caustic solution, an organic water immiscible solvent, at least one dihydric phenol of Formula V, at least one thiodiphenol of Formula VIII, a catalyst, a carbonate precursor, and a molecular weight regulator. A preferred heterogeneous interfacial polymerization system is one which uses phosgene as the carbonate precursor and methylene chloride as the organic solvent.

Another useful method for preparing the carbonate polymers of the instant invention involves the use of an organic solvent system wherein the organic solvent system may also function as an acid acceptor, at least one dihydric phenol of Formula V, at least one thiodiphenol of Formula VIII, a molecular weight regulator, and a carbonate precursor. A preferred method is one wherein phosgene is employed as the carbonate precursor and pyridine as an acid acceptor.

Generally, in both of the aforediscussed methods phosgene is passed into the reaction mixture containing at least one dihydric phenol of Formula V and at least one thiodiphenol of Formula VIII. The temperature at which the phosgenation reaction proceeds may vary from below 0° C. to above 100° C. The reaction proceeds satisfactorily at temperatures from room temperature (25° C.) to about 50° C. Since the reaction is exothermic the rate of phosgene addition may be used to control the reaction temperature.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be a hydroxide, a carbonate, a bicarbonate, or a phosphate of an alkali or alkaline earth metal.

The catalysts which can be employed are any of the catalysts that aid the polymerization of the diphenol such as bisphenol-A with phosgene. Suitable catalysts include, both are not limited to, tertiary amines such as, for example, triethylamine, tripropylamine, N,N-dimethylaniline, quaternary ammonium compounds such as, for example, tetraethylammonium bromide, cetyl triethylammonium bromide, tetra-n-heptylammonium iodide, tetra-n-propylammonium bromide, tetramethylammonium chloride, tetramethylammonium hydroxide, tetra-n-butylammonium iodide, benzyltrimethylammonium chloride, and quaternary phosphonium compounds such as, for example, n-butyltriphenyl phosphonium bromide and methyltriphenyl phosphonium bromide.

The molecular weight regulators employed may be any of the known compounds which regulate the molecular weight of the carbonate polymers by a chain stopping or terminating mechanism. These compounds include, but are not limited to, phenol, tertiarybutylphenol, and the like.

Also included herein are branched polycarbonates wherein a minor amount of a polyfunctional aromatic compound is coreacted with the diphenol, the thiodiphenol, and the carbonate precursor to provide a thermoplastic randomly branched polycarbonate.

The polyfunctional aromatic compounds contain at least three functional groups which are hydroxyl, carboxyl, carboxylic anhydride, haloformyl or mixtures thereof. Examples of the polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. These and other useful polyfunctional compounds are disclosed in U.S. Pat. Nos. 3,635,895; 4,001,184 and 4,204,047, all of which are hereby incorporated herein by reference.

Also included herein are blends of a linear polycarbonate and a branched polycarbonate.

The polycarbonate compositions of the instant invention contain an amount of thiodiphenol of Formula VIII effective to render said compositions flame retardant. Generally, in order to impart effective flame-retardancy to the polycarbonate compositions of the invention, the sulfur content thereof should be in the range of from about 3–13, preferably from about 5–10, weight percent based upon the total weight of the final composition. This amount of sulfur is equivalent to a thiodiphenol content of from about 23–98 mole percent in the broad range and about 35–70 mole percent in the preferred range, based on the amount of halogen-free and sulfur-free diphenol present.

The high molecular weight aromatic carbonate polymers of the instant invention generally have a weight average molecular weight in the range of from about 5,000 to about 200,000, preferably in the range of from about 10,000 to about 100,000, and more preferably in the range of from about 25,000 to about 50,000.

The carbonate polymers of the instant invention which are comprised of the coreaction products of (i) at least one dihydric phenol of Formula V, (ii) at least one thiodiphenol of Formula VIII, and (iii) a carbonate precursor contain at least two of the following repeating structural units:

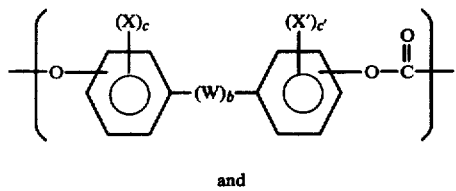

X.

and

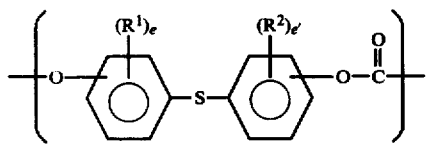

XI.

wherein X, X', $R^1$, $R^2$, W, c, c', b, e and e' are as defined hereinafore.

Thus, in Formulae I–IVb, A represents the residue of the diphenol of Formula V, i.e.:

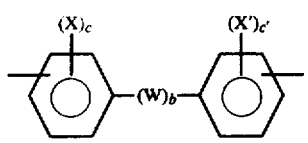

while B represents the residue of the thiodiphenol of Formula VIII, i.e.:

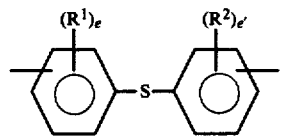

Also included within the scope of the instant invention are polycarbonate blends comprised of, in admixture:

(i) at least one halogen-free and sulfur-free non-polycyclic carbonate resin (hereinafter referred to as resin C) comprised of the coreaction products of
  (a) at least one halogen-free and sulfur-free non-polycyclic diphenol, such as that of Formula V, and
  (b) a carbonate precursor; and
(ii) at least one halogen-free sulfur-containing non-polycyclic carbonate resin (hereinafter referred to as resin D) comprised of the coreaction products of
  (a) at least one halogen-free and sulfur-free non-polycyclic diphenol of Formula V,
  (b) at least one halogen-free thiodiphenol of Formula VIII, and
  (c) a carbonate precursor.

These polycarbonate blends contain an amount of resin D effective to render said blends flame retardant. Generally, these blends are rendered flame retardant when they contain, in percent by weight, from about 3–13 percent sulfur, present in the form of the thiodiphenol of Formula VIII. Thus, these blends contain from about 23–98 mole percent of the thiodiphenol residue, based on the amount of halogen-free and sulfur-free diphenol present.

When, as described hereinafore, the diphenol of Formula V, the thiodiphenol of Formula VIII, and the carbonate precursor are coreacted with a dibasic acid a copolyester-carbonate is formed. Briefly stated, the copolyester-carbonate resins of this invention comprise recurring carbonate groups

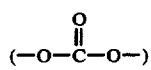

carboxylate groups

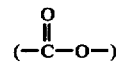

and aromatic carbocyclic groups in the linear polymer chain, in which at least some of the carboxylate groups and at least some of the carbonate groups are bonded directly to ring carbon atoms of the aromatic carbocyclic groups.

The copolyester-carbonates of the instant invention are prepared by coreacting, as essential ingredients, (i) a carbonate precursor, (ii) at least one halogen-free and sulfur-free non-polycyclic dihydric phenol of Formula V, (iii) at least one halogen-free thiodiphenol of Formula VIII, and (iv) at least one difunctional carboxylic acid or a reactive derivative thereof. These copolyester-carbonates may be characterized as halogen-free non-polycyclic amorphous copolyester-carbonates.

In general, any difunctional carboxylic acid conventionally used in the preparation of linear polyesters may be utilized in the preparation of the copolyester-carbonate compositions of the instant invention. Generally, the difunctional carboxylic acids which may be used include the aliphatic carboxylic acids, the aromatic carboxylic acids, and the aliphatic-aromatic carboxylic acids. These acids are disclosed in U.S. Pat. No. 3,169,121, which is hereby incorporated herein by reference.

The difunctional carboxylic acids which may be used generally conform to the general formula

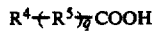  XII.

wherein $R^5$ represents an aromatic group such as phenylene, substituted phenylene, and the like; two or more aromatic groups connected by a single bond or by fusion or through non-aromatic linkages such as alkylene or alkylidene groups, e.g., biphenylene, naphthylene, and the like; and divalent aralkyl radicals such as tolylene, xylylene, and the like. $R^4$ is either a carboxyl or a hydroxyl group. The letter q represents one where $R^4$ is a hydroxyl group and either one or zero where $R^4$ is a carboxyl group.

Preferred difunctional carboxylic acids are the aromatic difunctional carboxylic acids, i.e., those acids of Formula XII wherein $R^5$ represents an aromatic radical and q is one. The preferred aromatic difunctional carboxylic acids are those represented by the general formula

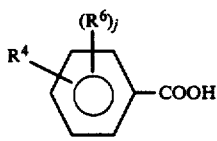  XIII.

wherein $R^4$ is as defined hereinafore; $R^6$ is independently selected from alkyl radicals, preferably those containing from 1 to about 6 carbon atoms; and j is a whole number having a value of from 0 to 4 inclusive.

Mixtures of these carboxylic acids may be employed, and where the term difunctional carboxylic acid is used herein it is to be understood that this term includes mixtures of two or more different difunctional carboxylic acids as well as individual difunctional carboxylic acids.

Particularly useful carboxylic acids are isophthalic acid, terephthalic acid, and mixtures thereof. A particularly useful aromatic carboxylic acid comprises a mixture of isophthalic acid and terephthalic acid wherein the weight ratio of isophthalic acid to terephthalic acid is in the range of from about 1:10 to about 10:1.

Rather than utilizing the difunctional carboxylic acids per se, it is possible, and sometimes even preferred, to employ the reactive derivatives of said acids. Illustrative of these reactive derivatives are the acid halides, such as the diacid halides. The preferred diacid halides are the diacid chlorides. Thus, for example, instead of employing isophthalic or terephthalic acid, terephthaloyl dichloride or isophthaloyl dichloride may be employed.

The copolyester-carbonates of the present invention may be prepared by known processes such as interfacial polymerization or phase boundary separation, transesterification, solution polymerization, melt polymerization, interesterification, and the like. Various prior art polymerization processes are disclosed in U.S. Pat. Nos. 3,030,311; 3,169,121; 3,207,184 and 4,188,314, all of which are hereby incorporated herein by reference. Although the processes may vary, several of the preferred processes typically include dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weigth regulator, that is, a chain stopper, is generally added to the reactants prior to or during contacting them with the carbonate precursor.

Also included herein are branched copolyester-carbonates wherein a polyfunctional compound of the type described hereinafore is a coreactant with the diphenol of Formula V and the thiodiphenol of Formula VIII in the reaction mixture, containing also the carbonate precursor and the ester precursor, i.e., the difunctional carboxylic acid or a reactive derivative thereof, to provide a thermoplastic randomly branched copolyester-carbonate resin.

The proportion of carboxylate and carbonate groups present in the final polymer can be suitably varied by varying the molar ratio of the diphenol and thiodiphenol to difunctional carboxylic acid. Where a dicarboxylic acid is used, it is preferable that this molar ratio of phenol to acid be more than one. Because of the presence of hydroxyl group in the hydroxy carboxylic acids, this preferred molar ratio does not apply in the case of hydroxy acid copolymers and virtually any ratio of dihydric phenol and thiodiphenol to hydroxy carboxylic acid may be conventionally used.

The copolyester-carbonates of the instant invention will generally contain, when a dicarboxylic acid is used, the following repeating structural units:
units of Formula X;
units of Formula XI;

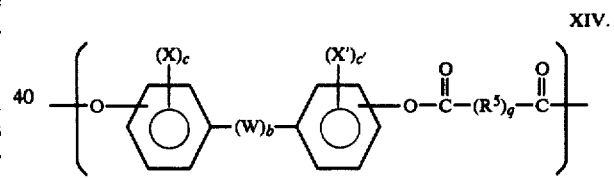

and

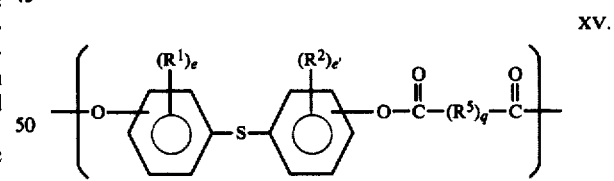

wherein X, X', $R^1$, $R^2$, $R^5$, W, c, c', e, e', b and q are as defined hereinafore.

The copolyester-carbonates of the instant invention will generally contain, when a hydroxy-carboxylic acid is used, the following repeating structural units:
units of Formula X;
units of Formula XI;

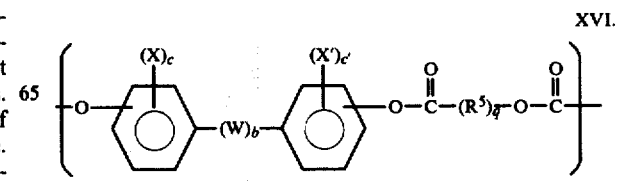

-continued and/or

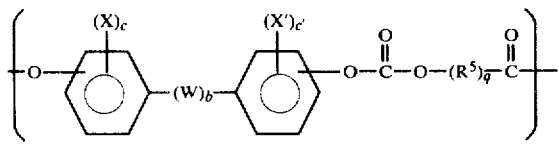

XVII.

and

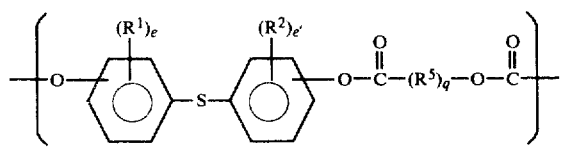

XVIII.

and/or

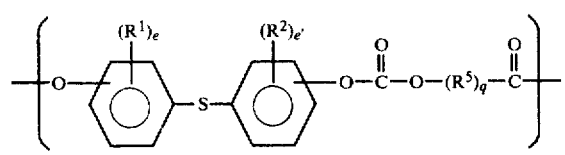

XIX.

wherein X, X', $R^1$, $R^2$, W, c, c', e, e', b, q, and $R^5$ are as defined hereinafore.

The copolyester-carbonates of the instant invention generally have a weight average molecular weight in the range of from about 5,000 to about 200,000, preferably from about 10,000 to about 100,000, and more preferably from about 25,000 to about 50,000.

These copolyester-carbonates contain an amount of residue of the thiodiphenol of Formula VIII effective to render the copolyester-carbonate resins generally flame retardant. Generally, in order to impart effective flame-retardancy to the copolyester-carbonate compositions of the invention, the sulfur content thereof should be in the range of from about 3–13, preferably from about 5–10, weight percent, based upon the total weight of the final composition. This amount of sulfur is equivalent to a thiodiphenol content of from about 23–98 mole percent in the broad range and from about 35–75 mole percent in the preferred range, based on the amount of the halogen-free and sulfur-free non-polycyclic diphenol present.

Also included with the scope of the instant invention are blends of copolyester-carbonate resins. These blends are comprised of, in admixture:

(i) at least one halogen-free and sulfur-free non-polycyclic copolyester-carbonate resin comprised of the coreaction products of (a) at least one halogen-free and sulfur-free non-polycyclic diphenol of Formula V, (b) at least one difunctional carboxylic acid or a reactive derivative thereof; and (c) a carbonate precursor (these resins being hereinafter referred to as resins E); and (ii) at least one halogen-free sulfur-containing non-polycyclic copolyester-carbonate resin (hereinafter referred to as resin F) comprised of the coreaction products of (a) at least one halogen-free thiodiphenol of Formula VIII, (b) at least one difunctional carboxylic acid or a reactive derivative thereof, and (c) a carbonate precursor.

In these blends resins E and F are present as physical mixtures or blends. Resin E contains repeating structural units of Formula X and at least one repeating structural unit of Formulae XIV, XVI, and XVII, while resin F contains repeating structural units of Formula XI and at least one repeating structural unit of Formulae XV, XVII and XIX.

Also included with the scope of this invention are copolyester-carbonate blends comprised of, in admixture:

(i) at least one copolyester-carbonate resin E; and (ii) at least one halogen-free sulfur-containing non-polycyclic copolyester-carbonate resin (hereinafter referred to as resin G) comprised of the coreaction products of:

(a) at least one halogen-free and sulfur-free non-polycylic diphenol of Formula V, (b) at least one halogen-free sulfur-containing thiodiphenol of Formula VIII, (c) at least one difunctional carboxylic acid or a reactive derivative thereof, and (d) a carbonate precursor.

In these blends resin G will contain repeating structural units of Formulae X and XI, at least one structural unit of Formulae XIV, XVI and XVII, and at least one structural unit of Formulae XV, XVII and XIX.

The polycarbonate and copolyester-carbonate compositions of the instant invention may also optionally contain certain commonly known and used additives such as, for example, antioxidants; antistatic agents; inert fillers; mold release agents; ultraviolet radiation absorbers such as the benzophenones, benzotriazoles, benzylidene malonates, and the liek; hydrolytic stabilizers such as the epoxides disclosed in U.S. Pat. Nos. 3,489,716, 4,138,379 and 3,839,247, all of which are hereby incorporated herein by reference; color stabilizers such as the organophosphites disclosed in U.S. Pat. Nos. 3,305,520 and 4,118,370, both of which are hereby incorporated herein by reference; and the like.

The polycarbonate compositions of the invention exhibit not only excellent flame retardant characteristics, but also exhibit higtherto unknown, felicitious combinations of outstanding properties such as impact strength, especially in thicker sections, and better thermal stability. Therefore, there are included in the test results shown hereinafter not only flame retardancy, but notched Izod impact and thermal gravimetric analysis as well.

PREFERRED EMBODIMENT OF THE INVENTION

The following example are presented to more fully and clearly illustrate the invention. Although the examples set forth the best mode presently known to practice the invention, they are intended to be and should be considered as being illustrative of, rather than limiting, the invention. In the examples, all parts and percentages are by weight unless otherwise specified.

EXAMPLE 1 (Comparative Example Procedures)

Into a mixture of 2,283 grams of pure 4,4'-isopropylidenediphenol (BPA) (mp 156°–157° C.; 10.0 mole grams), 5,700 grams water, 9,275 grams methylene chloride, 32.0 grams phenol and 10.0 grams triethylamine were introduced, at ambient temperature, 1,180 grams phosgene over a period of 97 minutes while maintaining the pH of the two phase system at about 11; i.e., pH 10–12.5, by simultaneously adding a 25% aqueous sodium hydroxide solution. At the end of the addition period, the pH of the aqueous phase was 11.7 and the BPA content of this phase was less tha 1 part per million (ppm) as determined by ultraviolet anaylsis.

The methylene chloride phase was separated from the aqueous phase, washed with an excess of dilute (0.01 N) aqueous HCl and then washed three times with deionized water. The polymer was precipitated by steam and dried at 95° C. The resultant, pure BPA-polycarbonate, which had an intrinsic viscosity (IV) in methylene chloride at 25° C. of 0.465 dl?g., was fed to an extruder, which extruder was operated at about 550° F., and the extrudate was comminuted into pellets.

The pellets were then injection molded at about 600° F. into test bars of about 5 in. by ½ in. by about ⅛ in. thick and into stepped test squares of about 2 in. by 2 in. by about ⅛ in. and 1/16 in. thick. The ⅛ in. test bars (5 for each test result shown in the Table) were subjected to the flame-retardancy test procedure set forth in Underwrites' Laboratories, Inc. Bulletin UL-94, Burning Test for Classifying Materials. In accordance with this test procedure, materials that pass the test are rated either V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛" of the specimen after flaming ceases and glowing is incapable of igniting absorbent cotoon.

"V-II": Average flaming and/or glowing after removal of the igniting flame shall not exceed 25 seconds and the specimens drip flaming particles which ignite absorbent cotoon.

In addition, a test bar which continues to burn for more than 25 seconds after removal of the igniting flame is classified, not by UL-94, but by the standards of the invention, as "burns". Further, UL-94 requires that all test bars in each test group must meet the V-type rating to achieve the particular classification; otherwise, the 5 bars receive the rating of the worst single bar. For example, if one bar is clasiffied as V-II and the other four (4) are clasiffied as V-0, then the rating of all bars is V-II.

Impact measurements by the notched Izod test were determined pursuant to ASTM D-256 on ⅛ and ¼ (for thick section impact) inch thick test bars.

Thermal gravimetric measurements were carried out on a perkins Elmer TGS1 instrument pursuant to ASTM D-1238, condition 0.

Melt flow rate of the polymer was determined according to ASTM-1238-70, condition 0.

EXAMPLE 2

The procedure of Example 1 was exactly repeated, except that half of the BPA (1141.5 g.) was replaced with 1091.5 g. of 4,4'-thiodiphenol (TDP) (m.p. 150°–152° C.) (5 moles; i.e., 50 mole % TDP, or about 6.6 wt. % sulfur in the final product) and only 19.8 g. of phenol was employed.

EXAMPLE 3

The procedure of Example 1 was exactly repeated, except that a mixture of 570.7 g (2.5 mole) of BPA and 1637.1 g of TDP (7.5 moles; i.e., 75 mole % TDP, or 9.8 wt. % sulfur in the final product) was used and only 16.9 g of phenol was employed.

EXAMPLE 4

Repeating the procedure of Example 1 with a mixture of 1712.5 g (7.5 moles) of BPA and 545.7 g of TDP (2.5 moles; i.e., 25 mole % TDP, or a 3.3 wt. % sulfur) yielded a polycarbonate having an IV of 0.478 dl/g.

The flame retardancy, notched Izod impact (for ⅛ inch thick samples) and thermal gravimetric results of the copolycarbonate test samples obtained from the foregoing examples are set forth in Table I herein below wherein the sample of Example 1, from which a conventional polycarbonate was obtained, is identified as the "Control".

EXAMPLE 5

The procedure of Example 2 was exactly repeated, except that BPA was replaced with 1342 g of 4,4-cyclohexylidenediphenol (m.p. 188° C.). The copolycarbonate obtained was found to be V-0 pursuant to UL-94.

EXAMPLE 6

The procedure of Example 2 was repeated except that 1482 g of 4,4'-cyclohexylidenebis(2-methylphenol) (m.p. 187°–188° C.) was employed in place of BPA. The copolycarbonate obtained was found to be V-0 pursuant to UL-94.

EXAMPLE 7

A physical mixture consisting of 2560 g of the polycarbonate of Example 1 and 2440 g of a polycarbonate prepared from TDP and phosgene was fed to an extruder operating at about 550° F. and the pellets obtained therefrom were molded into test samples as described in Example 1. The clear, colorless test bars obtained had a sulfur content of 6.0 wt. % and were found to be V-0 per UL-94.

EXAMPLE 8

Following the procedure of Example 7, additional test bars were obtained from a physical mixture consisting of 128 g of the polycarbonate of Example 1 and 2318 g of a TDP-polycarbonate. The clear, colorless test bars had a sulfur content of 12.4 wt. % and were found to be V-0 per UL-94.

EXAMPLE 9

Repeating the general procedure of Example 1 on a reduced scale by employing 76 g (0.33 mole) of BPA, 18.7 g (0.068 mole) of 2,2',6,6'-tetramethyl-4,4'-thiodiphenol (m.p. 121.5°–122.0° C.), 4 mole % (2.2 ml) of triethylamine, and 43.5 g of phosgene in 250 g of water and 400 g of methylenechloride yielded a tetramethylthiodiphenol-BPA copolycarbonate of 0.563 intrinsic viscosity and having a second order or glass transition temperature (Tg) of 155.6° C.

EXAMPLE 10

When the procedure of Example 9 was repeated by substituting 20.5 g (0.068 mole) of 2,2',3,3',6,6'-hexamethyl-4,4'-thiodiphenol (m.p. 188°–189° C.) for the tetramethylthiodiphenol there was obtained a hexamethylthiodiphenol-BPA copolycarbonate with an intrinsic viscosity of 0.344 and a Tg of 151.6° C.

EXAMPLE 11

Repeating the procedure of Example 9 but replacing the tetramethylthiodiphenol with 22.4 g (0.068 mole) of octamethyl-4,4'-thiodiphenol (m.p. 240.0°–241.5° C.) there was obtained an octamethylthiodiphenol-BPA copolycarbonate with an intrinsic viscosity of 0.497 and a Tg of 152.6° C.

EXAMPLE 12

The procedure of Example 1 was exactly repeated except that 456.6 g (2.0 moles) of the BPA was replaced with 436 g (2.0 moles) of 4,4'-thiodiphenol. Evaluation of the data of the resultant polymer, shown in Table II, indicates improved thick section ($\frac{1}{4}$ inch thick) notched Izod impact and increased melt flow of the sulfur-containing polycarbonate relative to the sulfur-free resin, even at the relatively low level (20 mole %) of thiodiphenol residue content.

EXAMPLE 13

This example illustrates the preparation of a prior art copolyester-carbonate polymer. This polymer does not contain any thiodiphenol residue in the polymer chain and, therefore, is outside the scope of the instant invention. This Example is presented for comparative purposes only and is a control.

To a 2-liter reaction vessel there were added 34.2 grams (0.15 mole) of 4,4-isopropylidenediphenol (p,p'-BPA) and 15.2 grams (0.075 moles) of isophthaloyl of dichloride dissolved in methylene chloride. The reaction vessel also contained 0.42 ml (2 mole %) of triethylamine, 0.35 g (2.5 mole %) of phenol, 300 ml methylene chloride and 400 ml water. Sodium hydroxide solution was added to the reaction vessel to maintain the pH of the reaction mixture at about 11.0. This was accomplished by adding 20% aqueous solution of sodium hydroxide. After the ester reaction ocurred, phosgene was delivered to the reaction vessel at the rate of 0.5 gram per minute for a period of 16 minutes, which represents 8.0 grams of phosgene. During this period the pH was controlled by adding 25% aqueous solution of sodium hydroxide. Phosgene was added for an additional 3 minutes at the rate of 0.5 gram per minute to react with any residual 4,4'-isopropylidenediphenol. The layers were separated, and the methylene chloride layer was washed with 0.01 N HCl followed by two washings with water. Methanol was added to the washed solution to precipitate the polymer, which was vacuum dried at 60° C. The molar ratio of the product was 1 mole isophthaloyl per 2 moles of 4,4'-isopropylidenediphenol and 1 mole of carbonate. The intrinsic viscosity of the resultant copolyester-carbonate was 0.513, and was V-2 in the UL-94 test of a $\frac{1}{8}$ inch thick bar.

EXAMPLE 14

This example illustrates the preparation of the novel copolyester-carbonate of the instant invention, i.e., one which contans a thiodiphenol residue in the polymer chain.

To a 1-liter reaction vessel there were added 13.6 grams (0.0625 mole) of 4,4'-thiodiphenol, 14.3 grams (0.0625 mole) of BPA, and 12.7 grams (0.0625 mole) of isophthaloyl of dichloride dissolved in methylene chloride. The reaction vessel also contained 0.24 ml (2 mole %) of triethylamine, 0.38 gram (2 mole %) of phenol, 100 ml methylene chloride, and 300 ml of water. Sodium hydroxide solution was added to the reaction vessel to maintain the pH of the reaction mixture at about 11.0. This was accomplished by adding 20% aqueous solution of sodium hydroxide. After the ester reaction ocurred, phosgene was delivered to the reaction vessel at the rate of 0.5 gram per minute for a period of 10 minutes. During this period the PH of the formulation was controlled by adding 25% aqueous solution of sodium hydroxide. Phosgene was added for an additional 3 minutes at the rate of 0.5 gram per minute. to react with any residual bisphenol. The layers were separated, and the methylene chloride layer was washed with 0.01 N HCl followed by two wsahings with water. Methanol was added to the washed solution to precipitate the polymer, which was vacuum oven dried at 60° C. The molar ratio of the product was 1 mole ester, 1 mole carbonate, 1 mole thiodiphenol residue, and 1 mole of BPA residue. The product had an intrinsic viscosity of 0.694 and was V-0 per UL-94 test for a compressed bar $\frac{1}{8}$ inch thick.

TABLE I

| TEST SAMPLE FROM EXAMPLE | AMOUNT OF DIPHENOL | | MOL. RATIO (BPA:TDP) | SULFUR FOUND (wt %) | INTRINSIC VISCOSITY (dl/g) | N. IZOD $\frac{1}{8}$ in. (ft. lb.) | THERMAL GRAVIMETRY[a] | | UL-94 | | |
|---|---|---|---|---|---|---|---|---|---|---|---|
| | BPA (g) | TDP (g) | | | | | 5% wt. loss (°C.) | 50% wt. loss (°C.) | Flame-out Time (sec.) | Drips (per 5 bars) | Rating |
| Control | 2,283 | 0 | 1:0 | 0.0 | 0.465 | 16.2 | 338 | 380 | 26.0 | 13 | Burns |
| 2 | 1,141.5 | 1,091.5 | 1:1 | 6.4 | 0.462 | 13.4 | 362 | 401 | 3.8 | 0 | V-O |
| 3 | 570.7 | 1,637.1 | 1:3 | 9.7 | 0.524[b] | 13.8 | 370 | 414 | 3.2 | 0 | V-O |
| 4 | 1,712.2 | 545.7 | 3:1 | 3.1 | 0.478 | 16.5 | 350 | 393 | 4.6 | 0 | V-O |

[a]Analysis carried out in air
[b]Determined in s-tetrachloroethane instead of methylene chloride

TABLE II

| TEST SAMPLE FROM EXAMPLE | INTRINSIC VISCOSITY (dl/g) | N. IZOD $\frac{1}{8}$ in. (ft. lb.) | MELT FLOW RATE (gr/10 min.) |
|---|---|---|---|
| *Control | 0.529 | 2.1 | 7.1 |
| 12 | 0.510 | 2.3 | 9.8 |

*Prepared as in Example 1, but with higher IV.

As can be seen from the above data the polymers of the instant invention are flame retardant, have a higher flow rate, i.e., are easier to process, and have improved thick section impact as compared with prior art polymers which do not conatin a thiodiphenol residue in the polymer chain.

The term "non-polycylic" as used herein with respect to the polycarbonates, copolyester-carbonates, and the diphenols of Formulae V, VI and VII is meant to specify that the divalent aliphatic groups, i.e., W, Z and W', bridging the two aromatic nuclear residues of the diphenol are non-polycyclic, i.e., they are selected from non-cyclic aliphatic radicals such as alkylene and alkylidene radicals, or monocyclic aliphatic radicals such as cycloalkylidene and cycloalkylene radicals. Thus, the non-polycyclic diphenols of Formulae V and VII do not include, by definition, those polycyclic bisphenols wherein the bridging group connecting the two aromatic nuclear residues is, for example, a bicyclic bridged or fused hydrocarbon such as the 2-norbornylidene or bicyclo(3,3,0)octylene rings.

The foregoing detailed description has been given for clearness of understanding only and no unnecessary limitations are to be understtod therefrom. The invention is not limited to the exact details shown and described, for obvious modifications will occur to those skilled in the art.

What is claimed is:

1. A thermoplastic, amorphous, halogen-free, high molecular weight, aromatic copolyester-carbonate resin comprised of the coreaction products of:

(i) at least one halogen-free and sulfur-free diphenol, of the formula

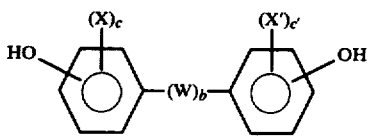

wherein:

X is independently selected from monovalent hydrocarbon radicals;

X' is independently selected from monovalent hydrocarbon radicals;

W is selected from the group consisting of non-polycyclic divalent hydrocarbon radicals, the —O— radical, and the

radicals;

c and c' are independently selected from whole numbers having a value of from 0 to 4 inclusive; and b is either zero or one;

(ii) at least one halogen-free thiodiphenol;

(iii) at least one dicarboxylic acid or a polyester forming derivative thereof; and (iv) a carbonate precursor.

2. The resin of claim 1 which contains an amount of sulfur effective to render said composition flame retardant.

3. The resin of claim 2 wherein said amount of sulfur is in the range of from about 3 ∝ 13 percent by weight based upon the weight of said composition.

4. The resin of claim 2 wherein said sulfur is present in the form of said thiodiphenol.

5. The resin of claim 4 which contains an amount of said thiodiphenol effective to render said composition flame retardant.

6. The resin of claim 5 wherein said amount of said thiodiphenol is in the range of from about 23-98 mole percent.

7. The resin of claim 1 wherein said non-polycyclic divalent hydrocarbon radicals are selected from the group consisting of alkylene radicals, alkylidene radicals, cycloalkylene radicals, and cycloalkylidene radicals.

8. The resin of claim 7 wherein said monovalent hydrocarbon radicals are selected from the group consisting of alkyl radicals, aryl radicals, aralkyl radicals, and alkaryl radicals.

9. The resin of claim 8 wherein said monovalent hydrocarbon radicals are alkyl radicals.

10. The resin of claim 9 wherein W is selected from the group consisting of alkylene radicals, alkylidene radicals, cyclaolkylene radicals, and cycloalkylidene radicals.

11. The resin of claim 1 wherein said halogen-free thiodiphenol is represented by the general formula

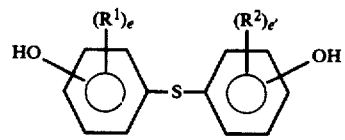

wherein:

$R^1$ is independently selected from monovalent hydrocarbon radicals;

$R^2$ is independently selected from monovalent hydrocarbon radicals; and e and e' are independently selected from whole numbers having a value of from 0 to 4 inclusive.

12. The resin of claim 11 wherein said monovalent hydrocarbon radicals are selected from the group consisting of alkyl radicals, aryl radicals, alkaryl radicals, and aralkyl radicals.

13. The resin of claim 12 wherein said monovalent hydrocarbon radicals are alkyl radicals.

14. The resin of claim 11 wherein said thiodiphenol is selected from the group consisting of 4,4'-thiodiphenol, 2,2',6,6'-tetramethyl-4,4'-thiodiphenol, 2,2',3,3',6,6'-hexamethyl-4,4'-thiodiphenol, and octamethyl-4,4'-thiodiphenol.

15. The resin of claim 1 which further contains, in physical admixture, at least one halogen-free and sulfur-free high molecular weight aromatic copolyester-carbonate resin comprised of the coreaction products of:

(i) at least one halogen-free and sulfur-free diphenol of the formula

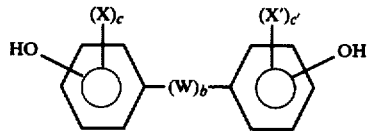

wherein:

X is independently selected from monovalent hydrocarbon radicals;

X' is independently selected from monovalent hydrocarbon radicals;

W is selected from the group consisting of non-polycyclic divalent hydrocarbon radicals, the —O— radical, and the

radical;

c and c' are independently selected from whole numbers having a value of from 0 to 4 inclusive; and b is either zero or one;

(ii) at least one difunctional carboxylic acid or a polyester forming derivative thereof; and (iii) a carbonate precursor.

16. The resin of claim 15 wherein said divalent non-polycyclic hydrocarbon radicals are selected from the group consisting of alkylene radicals, alkylidene radicals, cycloalkylene radicals, and cycloalkylidene radicals.

17. The resin of claim 16 wherein said monovalent hydrocarbon radicals are selected from the group consisting of alkyl radicals, aryl radicals, aralkyl radicals, and alkaryl radicals.

18. The resin of claim 17 wherein said monovalent hydrocarbon radicals are alkyl radicals.

19. The resin of claim 18 wherein W is selected from the group consisting of alkylene radicals, alkylidene radicals, cycloaklylene radicals, and cycloalkylidene radicals.

* * * * *